United States Patent [19]
Acosta

[11] 3,750,889
[45] Aug. 7, 1973

[54] FILTER TUBE
[76] Inventor: William A. Acosta, 4101 Laurel Dr., Lafayette Hill, Pa. 19444
[22] Filed: June 17, 1971
[21] Appl. No.: 154,107

[52] U.S. Cl. ............................... 210/497, 210/499
[51] Int. Cl. ............................................. B01d 29/10
[58] Field of Search .................. 210/323, 332, 333, 210/497, 497.1, 498, 499; 55/337

[56] References Cited
UNITED STATES PATENTS

| | | | |
|---|---|---|---|
| 3,442,391 | 5/1969 | Bozek | 210/497 |
| 3,327,864 | 6/1967 | Ball et al. | 210/497 |
| 3,685,657 | 8/1972 | Hunter et al. | 210/497 |
| 3,633,343 | 1/1972 | Mark | 55/337 |
| 3,253,714 | 5/1966 | Quinlan et al. | 210/497 |
| 3,394,815 | 7/1968 | Harms et al. | 210/497 |

*Primary Examiner*—Charles N. Hart
*Attorney*—Caesar, Rivise, Bernstein & Cohen

[57] ABSTRACT

A filter tube comprising a perforated core, a connector at one end of the core, a plug at the other end of the core and a filter sleeve overlying the core. A core support or stabilizer is placed within the core, and comprises a rigid helical member. A channeled perforated drain screen is positioned between the filter sleeve and the core. The filter sleeve is removable and replaceable. The drain screen directs the filtered fluid passing through the filter sleeve into and through the core in laminar flow.

6 Claims, 6 Drawing Figures

PATENTED AUG 7 1973 3,750,889

INVENTOR.
WILLIAM A. ACOSTA
BY
Caesar, Rivise,
Bernstein & Cohen
ATTORNEYS.

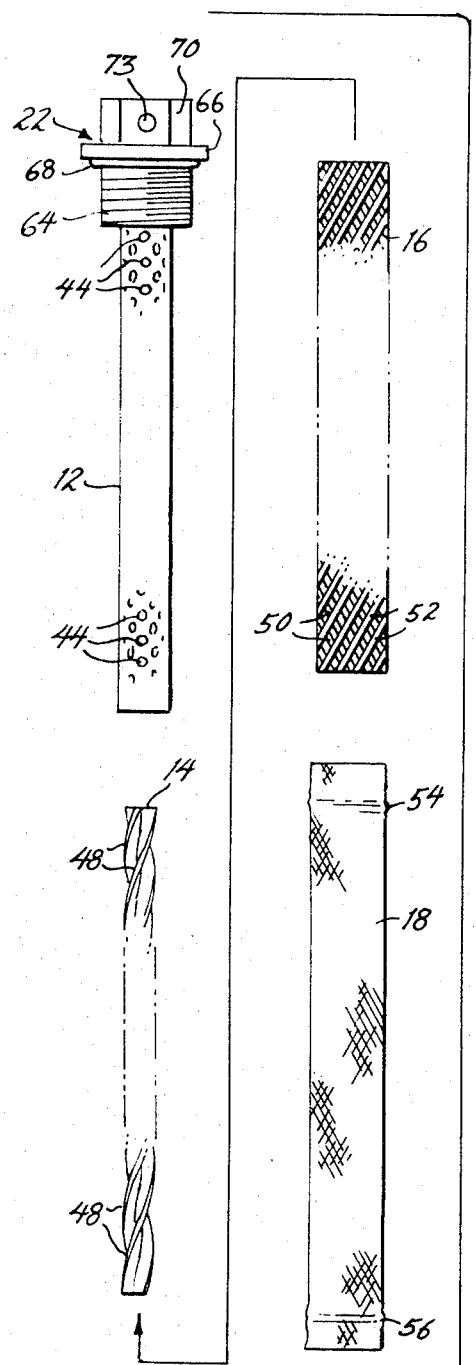
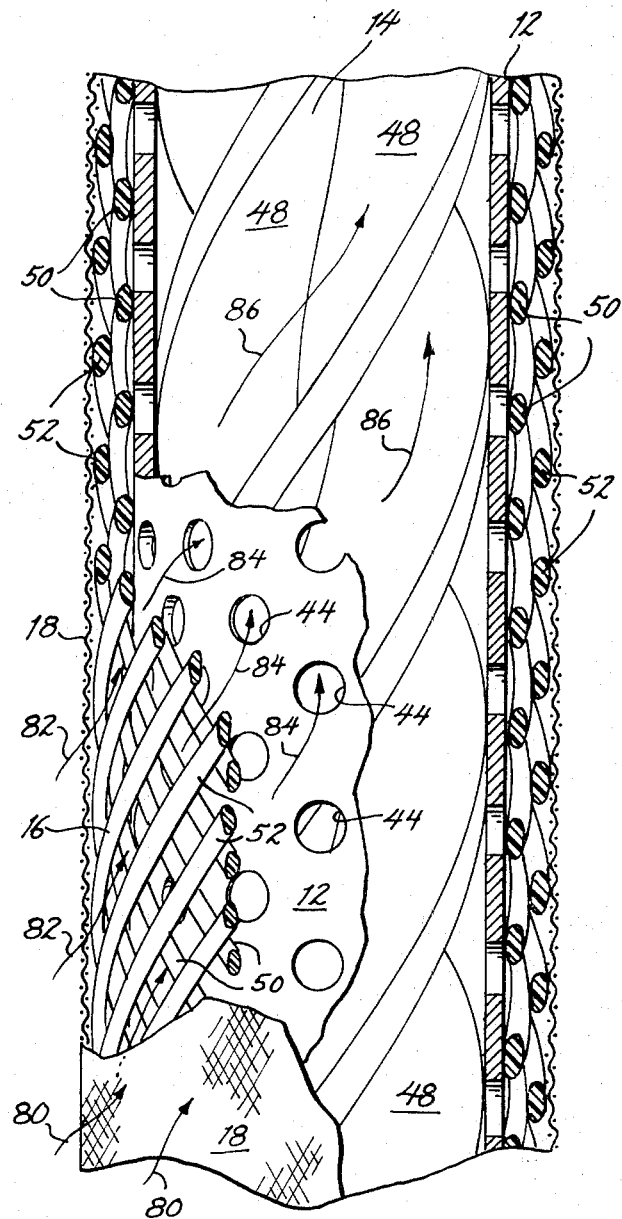
Fig.5.
Fig.6.
INVENTOR.
WILLIAM A. ACOSTA

FILTER TUBE

This invention relates to a filter tube, and more particularly, to a filter tube having a replaceable filter element which renders the filter tube indefinitely reusable.

Filter tubes are now in common usage, and generally are used by suspending them from a tube sheet. The tube sheet divides a filter vessel into two basic chambers, a dirty chamber and a clean chamber. A fluid that is to be filtered enters the dirty chamber, passes through the filter tube and up through the interior of the filter tube to the clean chamber, which is positioned in the upper portion of the filter vessel. Thereafter, the filtered fluid is removed from the clear chamber.

The filter tubes that are in use have a number of elements which are common to all of them. These elements include a perforated core, a filter sleeve overlying the core, a bottom plug in the core and a connector connecting the tube to the tube sheet. All of the cores in use are rigid, but where they are made from a material that does not have sufficient strength to withstand the fluid pressures, a core support is used. The core support maintains the strength of the core and prevents the core from collapsing during the filtering operation.

The cores presently in use can be made of any rigid material, such as metal or plastic The core supports are generally used when the core is formed from plastic. The filter sleeve generally used is a woven wire cloth. The filter sleeve is generally secured to the core, and periodically the entire filter tube must be replaced when the filter sleeve becomes too contaminated with the filtered solids to prevent satisfactory backwashing, or when the filter sleeve becomes damaged or worn out through continued use.

The filter tube of this invention provides a number of distinct advantages over all of the filter tubes presently in use. One of these advantages is obtained through the use of a drain screen which is positioned between the filter sleeve and the core. In the filter tubes presently in use, the fluid flow through the filter sleeve into the core is necessarily limited because the core is only partially perforated, and therefore no fluid can pass into the core where the filter screen contacts an unperforated portion of the core. Additionally, even where the filter screen overlies a perforated area of the core, there is still a reduced flow because of the space occupied by the filter screen.

The drain screen of this invention comprises a plurality of intersecting channels. All of the fluid that passes through the filter sleeve enters one of these channels and ultimately passes into and through one of the perforations of the core when the channel is aligned with one of the perforations. Through the use of the drain screen, the flow rate is doubled for any given filter system. Additionally, because of the channeling of the fluid by the drain screen, the fluid passes into the core in laminar flow instead of the turbulent flow which normally occurs in the present filter tubes.

The net result of using the drain screen is an increase in flow rates, a reduction in pressure drops, longer filter cycles without the necessity of backwashing, and improved backwashing and cleaning of the filter medium, which is accomplished by reverse flow. The drain screen is usable on all types of filter sleeves, regardless of the nature of the sleeves.

In another aspect of the filter tube of this invention, the filter sleeve is removable and replaceable. In the present types of filter tubes, when the filter sleeve is damaged or contaminated, the entire tube must be replaced. In the filter tube of the present invention, a mechanism is provided for removing the filter sleeve and replacing it with a new one. All other parts of the filter tube are retained and reused. This obviously results in a lower priced replacement, since all salvagable parts are reused.

In order to accomplish the ready replacement of the filter screen, the filter tube of this invention also includes a novel mechanism for securing the filter sleeve in place. This mechanism includes the provision of nonfilter areas at the top and bottom of the core. An expansion collar is provided by the filter tube connector, and no filtering takes place in the area of the expansion collar. Thus, if there is dissimilar longitudinal expansion or contraction of the elements of the filter tube during use, no leak can occur on either the top or the bottom of the filter tube. Accordingly, filtration will always be complete whenever the filter tube is used, regardless of rates of expansion of the elements and regardless of a slightly improper fitting of the filter sleeve on the core when the sleeve is replaced.

In another aspect of the filter tube of this invention, a novel internal support is provided in order to rigidify or stiffen the filter core. In the filter tubes presently in use, the support or stiffener generally comprises a metal rod that includes vertical channels for the filtered fluid. These rods are either Y-shaped or comprise a pair of plates that intersect at right angles. The filtered fluid rises vertically through the channels formed by the stiffener into the clean chamber.

In the device of this invention, the support comprises a helically twisted, four-bladed member. The helical design channels the filtered fluid in a spiral path up through the filter tube. The support serves the same function as other supports in that it stiffens the core. However, the helical design provides substantially greater strength capabilities than the vertically channeled supports presently in use. This is because the external pressures of the filtered fluid are transfered into a circumferential spiraling path, rather than the right angle deflection which occurs when using the vertical-channel supports presently in use.

Another advantage of the helical support occurs during the backwashing of the filter tube. Thus, the spiral path formed by the blades causes the reverse flow of the backwash fluid to move more rapidly out of the core by a cyclone effect. When using the vertical channel supports, the backwash fluid moves turbulently out of the core since this fluid must first pass vertically downward into the core and then must rebound on a 90° angle to its normal direction of flow. Using this system, the backwash flow is not nearly as effective as when using the spiral channel system of the present invention.

It is accordingly an object of the present invention to provide a novel filter tube.

It is another object of this invention to provide a filter tube having a replaceable filter screen, increased filtration rates, improved backwashing and laminar flow during the filtering and backwashing processes.

These and other objects of this invention are accomplished by providing a filter tube comprising a perforated core, said core having an upper end and a lower end, means sealing said lower end, a connector formed on said upper end, a filter sleeve and a drain screen positioned between said core and said filter sleeve.

Other objects and many of the attendant advantages of this invention will be readily appreciated as the same becomes better understood by reference to the following detailed description when considered in connection with the accompanying drawings wherein:

FIG. 5 is an exploded front elevational view of the elements comprising the filter tube of this invention; and FIG. 6 is a front elevational view, partially broken away, showing the flow patterns of filtered fluid through the filter tube of this invention.

Figure 1:
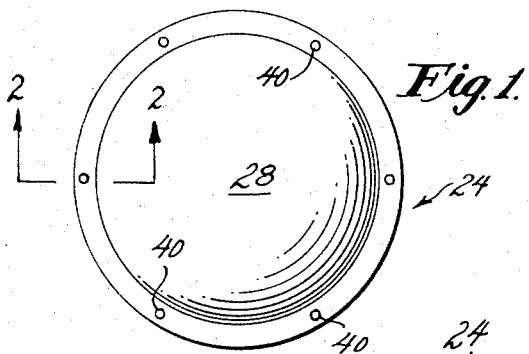
FIG. 1 is a top plan view of a filter vessel utilizing the filter tube of this invention.

Referring now in greater detail to the various figures of the drawings wherein like reference characters refer to like parts, a filter tube embodying the present invention is generally shown at 10 in FIG. 1. Device 10 basically comprises a core 12, a stabilizer 14, a drain screen 16, a filter sleeve 18, a plug 20 and a connector 22.

The filter tube 10 of this invention is utilizable in any of the filter systems known to the art. By way of example, a filter system utilizing the tubes 10 is generally shown at 24 in FIGS. 1 and 2. System 24 comprises a vessel having a lower chamber 26 for dirty incoming fluid and an upper chamber 28 for filtered fluid. A tube sheet 30 separates the two chambers, and a plurality of filter tubes 10 is secured in the tube sheet 30. The filter tubes 10 are arranged in a spaced pattern around the tube sheet. By way of example, they can be arranged in the form of concentric circles emanating from the center of the tube sheet.

The lower chamber 26 includes an upper annular flange 32, and the cover of the upper chamber 28 includes a lower annular flange 34. The tube sheet 30 is received at its outer edge between flanges 32 and 34, and a fluid-tight seal is obtained through the use of gaskets 36 and 38. The cover of the upper chamber is secured to the lower chamber through the use of bolts 40 which pass through flanges 32 and 34, and their associated gaskets. The bolts are held in place by any conventional means, such as nuts 42 (one shown in FIG. 2).

The filter tubes 10 are used in the filter system 24 in the same manner as the prior art filter tubes. Thus, dirty fluid, such as machine oil that has been contaminated with metal chips, is passed into lower chamber 26. The oil passes through filter tubes 10, leaving the chips on the exterior of the tubes. The filtered oil then passes up through the filter tubes 10 and into the upper chamber 28. The filtered oil is then drained from the upper chamber by any of the means known to the art, such as a drain pipe which is centrally located on tube sheet 30. During backwashing, clean fluid will pass up through the drain pipe, into upper chamber 28, and down through filter tubes 10, thereby discharging all of the metal chips that have been deposited on the exterior surface of the filter tubes. The backwash fluid is then drained away, and the filter system is again usable for filtration purposes.

Figure 2:
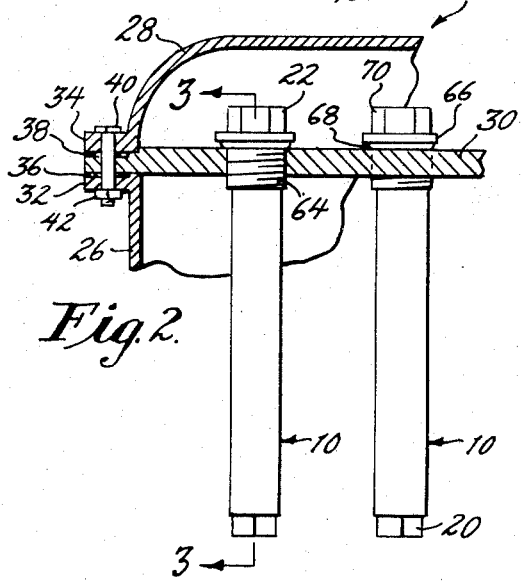
FIG. 2 is an enlarged sectional view taken along the line 2—2 of FIG. 1.

The filter tubes of this invention are utilizable with any filter system known to the art, and the specific system shown in FIGS. 1 and 2 is for the purposes of illustration only. For a more detailed description of a filter system similar to that shown in FIGS. 1 and 2, reference is made to my prior U.S. Pat. No. 3,421,630.

Figure 4:
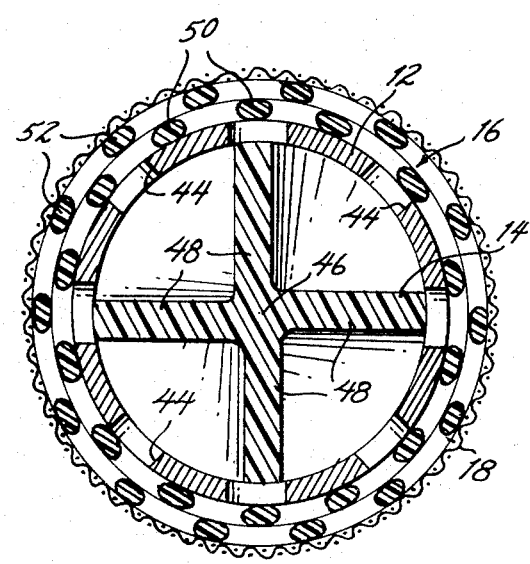
FIG. 4 is an enlarged sectional view taken along the line 4—4 of FIG. 3.

Referring to FIGS. 4 and 5, it is seen that core 12 is cylindrical and includes a plurality of spaced holes 44 formed therein. Core 12 is hollow, and thus is circular in cross-section. Stabilizer 14 is positioned within core 12, and has an external diameter which is equal to the internal diameter of the core. The stabilizer is held within the core by a friction fit.

Figure 3:
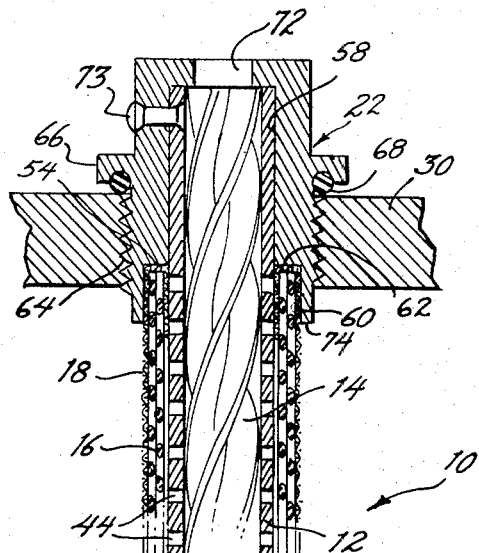
FIG. 3 is an enlarged sectional view taken along the line 3—3 of FIG. 2, and showing the filter tube of this invention in cross section.

Referring to FIG. 4, it is seen that stabilizer 14 comprises, in cross-section, a central rod 46 and four equally spaced blades 48 projecting therefrom. As seen in FIGS. 3 and 6, the blades 48 travel upwardly and around core 46 in a helical pattern. An upwardly directed channel is formed between each adjacent pair of blades 48. The purpose of stabilizer 14 is to reinforce the core 12, in order to permit the core to retain its tubular configuration, and in addition, direct the flow of fluids within the core.

Drain screen 16 is also circular in cross-section, and has an internal diameter which is slightly greater than the external diameter of core 12. The drain screen is molded from any suitable plastic, and comprises a plurality of equally spaced, downwardly projecting rods 50 and a plurality of equally spaced, upwardly projecting rods 52. Rods 50 and 52 are integrally molded, and are secured together at their points of intersection during the molding process. As seen in FIG. 6, rods 52 form channels between each adjacent pair of the rods.

Filter sleeve 18 comprises a seamless woven tubular fabric. A plastic fabric is preferred, such as nylon. Fold lines are generally indicated at 54 and 56 in FIG. 5.

In assembling the filter tube of this invention, drain screen 16 is inserted in filter sleeve 18, and the upper and lower ends of the sleeve are folded over at the respective fold lines 54 and 56, and tucked into the drain screen. This condition is shown in FIG. 3. Thereafter, the stabilizer 14 is inserted in core 12 and the drain screen is slid over the core. The assembly comprising the stabilizer, core, drain screen and filter sleeve is then inserted in connector 22.

Referring to FIG. 3, it is seen that the connector 22 comprises a tube having a hollow cylindrical bore 58. Bore 58 is enlarged at its bottom to provide a bore 60 having an upper horizontal shoulder 62. Connector 22 is externally threaded, as shown at 64. The connector is threadedly secured in tube sheet 30 by threads 64.

An annular flange 66 is formed above threads 64. Flange 66 has an annular groove formed in the underside thereof, and an O-ring 68 is received in the groove. The top of connector 22 has a hexagonal cross-section 70 (FIG. 2), and is provided with a central opening 72 (FIG. 3) which is in fluid communication with bore 58.

In the assembly process of the filter tube 10 of this invention, core 12, with stabilizer 14 therein, is slid into bore 58 of connector 22. The core is held in place by a pressed fit. If desired, additional securing means can be used, such as rivet 73. Thereafter, the assembly of drain screen 16 and filter sleeve 18 is slid over core 12 into bore 60. Here again, there is a forced fit between the drain screen and the wall of the bore 60 and the wall of core 12. Connector 22 forms a collar 74 around drain screen 16 and the associated filter sleeve 18.

After the core, stabilizer, drain screen and filter sleeve have been inserted in connector 22, the lower end of the assembly is capped. By way of example, plug 20, which has external threads 76, is threadedly secured in the bottom end of core 12. The head 78 of plug 20 abuts the bottom end of the drain screen and forces the drain screen tightly into bore 60 formed in collar 74 of connector 22.

All of the filter tubes 10 are secured on tube sheet 30 in the manner described above. After the tube sheet has been completely filled with the filter tubes, the tube sheet is inserted in the filter vessel, along with its dependent tubes, in the manner shown in FIG. 2. At this point, the filter system is ready for use.

In use, the fluid to be filtered enters the lower chamber 26 of the filter system 24. As seen in FIG. 6, the fluid first passes through filter sleeve 18, as indicated by arrows 80. This permits clean fluid to pass through the screen, while the contaminants of the fluid are deposited on the screen. After the fluid has passed through the screen, it enters the channels formed by rods 52 of drain screen 16, as indicated by arrows 82.

The fluid passes upwardly in the drain screen channels until it contacts one of the holes 44 in core 12. It then passes through holes 44, as indicated by arrows 84.

After the fluid passes through holes 44, it enters the channels formed by blades 48 of stabilizer 14, and passes upwardly through these channels as indicated by arrows 86. Referring to FIG. 3, it is seen that as the fluid passes upwardly through stabilizer 14, it will ultimately reach the top of connector 22, and pass into the upper chamber 28 of the filter system through opening 72 in the connector. Thereafter, the clean fluid entering chamber 28 is drawn off.

In the backwashing of the filter system utilizing the tubes of this invention, the above described process is reversed. Thus, clean backwash fluid enters chamber 28 under pressure. This fluid then passes through opening 72 in connector 22 and into the channels formed in stabilizer 14. The fluid passes downwardly through these channels in a whirling, cyclonic motion. The fluid then passes from the channels through openings 44 into the channels formed in drain screen 16. The fluid then passes from these channels through filter sleeve 18, thereby removing the contaminants that have been deposited on the filter sleeve. After the filter sleeve has been cleaned, the flow through the system is reversed, and the system is again usable for filtering the fluid.

The filter tube of this invention can be used in the filtration of any fluid, whether liquid or gaseous. Thus, it can be used on the filtering of solvents, oil, water or air. As pointed out above, one specific use is for the filtration of machine oil that has been contaminated with ground or drilled particles of metal.

The various elements forming the filter tube of this invention can be made from any of the materials known to the art, such as metal or plastic. Aluminum or stainless steel can be used in the manufacture of the core, stabilizer and drain screen. Alternatively, these elements can be molded from such plastics as polypropylene, polyvinyl chloride or polyethylene. The plug 20 can also be made from these materials. The filter sleeve 18 is preferably made from a seamless cloth, such as nylon. However, wire screening can also be used.

It is seen by reference to FIG. 5 that the filter tube of this invention can readily be disassembled and reassembled to replace any worn out part. The most commonly replaced part is the filter sleeve 18, since the remainder of the elements of the filter tube are extremely durable and have an indefinite life. The filter sleeve 18 will normally have to be replaced when it becomes too contaminated with residue to be effectively cleaned by backwashing. All that is required during the replacement of the filter sleeve is to slide the sleeve off drain screen 16 and replace the sleeve in the same manner described above. Thus, after the filter sleeve is slid over the drain screen, its ends are tucked into the drain sleeve and the drain sleeve is again slid over the core 12.

In another aspect of this invention the drain screen 16 and filter sleeve 18 can be joined as a single unit. Thus, after the ends of the sleeve are tucked into the drain screen, they are held securely in place on the drain screen by any convenient means, such as an epoxy or other adhesive. Accordingly, when it is desired to replace the filter sleeve 18, both the sleeve and the drain screen are removed and replaced by a new unit.

It is seen by reference to FIG. 6 that the drain screen 16 provides for a much higher effectiveness of filter area than could be obtained when using the core 12 without the drain screen. Thus, if there were no drain screen, the fluid to be filtered would pass through the filter sleeve 18 only in the areas where holes 44 are present. All other portions of the filter sleeve would be ineffective for filtration if the filter sleeve were contiguous with the core. However, having the drain screen 16 permits filtration over a far greater area of the core 12. This is because the filtered fluid can pass through the filter sleeve 18 over substantially the entire circumference of the drain screen 16. This is accomplished because the drain screen need not have the inherent strength of the core, and therefore can be much more porous.

The filtered fluid, after passing through the filter sleeve, then enters a channel formed between a pair of adjacent rods 52. The filtered fluid passes upwardly in the channel until it can pass through a hole 44 in the core 12. Because of the channel characteristics of the drain screen, a laminar flow is formed along the surface of the core, thereby resulting in increased flow rates. Pressure drops are also reduced, there is a more effective and useful filter area for a given size of filter tube, there is a longer filter cycle, and there is an improved backwash during the reverse flow, in view of the channeled drain screen.

The drain screen of this invention can be used with all types of filter tubes, and need not necessarily be used with the specific filter tube of this invention. Thus, it can be used with self-supporting metallic cores or with plastic cores having any of the stabilizers of the prior art. However, it has been found to be most effective when used in combination with the other elements forming the filter tube of this invention.

The stabilizer 14 possesses a number of advantages over the prior art stabilizers. In all of the prior art stabilizers, contact is made with the inner wall of the core only along vertical lines, with channels being formed between the bars having the vertical line contact with the wall. In Applicant's device, a more even support is formed on the wall of the core in view of the helical nature of the stabilizer. Thus, the wall of the core is supported evenly around its entire circumference.

Additionally, the helical channels in the stabilizer promote better fluid flow, as explained above. This is particularly important during the backwashing of the filter tube. It should also be noted that the stabilizer 14 need not be used in the specific filter tube of this invention, but can be used to stabilize any of the filter tubes known to the art.

The collar 74 of connector 22 insures that no unfiltered fluid passes through the core 12. This feature is apparent in FIG. 3. Thus, if the drain screen 16 and filter sleeve 18 are not tightly inserted into the connector 22, there will still be no leakage into the core since there is a tight fit between the collar 74 and the drain screen and filter sleeve. Additionally, if there are uneven rates of longitudinal expansion of the various elements of the filter tube during use, and if, during this expansion, the core should expand more than the drain screen and filter sleeve, there will still be sufficient coverage of the top of the drain screen and filter sleeve to prevent leakage.

The filter tube of this invention can be used with any of the connectors known to the art. Thus, instead of having the threaded connection 64 in the tube sheet 30, a forced fit connection can be used. Other types of connectors are permanent connectors on the tube sheet 30 in which the core and filter sleeve are snapped, or connectors that are held in place by a top plate on tube sheet 30. Regardless of the type of connector used, however, it is preferable to have a dependent collar, such as collar 74, in order to insure against leakage in the event of differential thermal expansion during use.

Plug 20 can be replaced by any of the closures known to the filter tube art. Thus, a cap can be placed over the filter sleeve and drain screen, which cap can either be removable or permanent. Likewise, instead of having the threaded connection 76 for the plug, the plug can be held in place by a forced fit. Additionally, a permanent plug can be used, and an assembly can be provided comprising the drain screen, filter sleeve and permanent plug.

Without further elaboration, the foregoing will so fully illustrate my invention that others may, by applying current or future knowledge, readily adapt the same for use under various conditions of service.

I claim:
1. A filter tube comprising a tubular core, said core having a plurality of perforations passing therethrough, a tubular filter sleeve and a tubular drain screen positioned between said core and said filter sleeve, said drain screen having channels formed therein, with each of said channels being in fluid communication with at least one of the perforations in said core, said drain screen comprising a first plurality of spaced parallel bars extending in a first direction and a second plurality of spaced parallel bars extending in a second direction, said second plurality of parallel bars overlying said first plurality of parallel bars to form said channels, said second plurality of bars being inclined, whereby fluid passing through said filter sleeve passes in laminar flow in said channels and through said perforations.

2. The filter tube of claim 1 wherein said core has an upper end and a lower end, and further including means sealing said lower end and a connector formed on said upper end.

3. The filter tube of claim 1 wherein the amount of perforated surface in said drain screen is in excess of the amount of perforated surface in said core.

4. The filter tube of claim 1 wherein said drain screen is molded from a plastic, and said second plurality of bars intersect with said first plurality of bars, with said bars being joined at their points of intersection.

5. The filter tube of claim 1 and further including a stabilizer within said core, said stabilizer comprising a central bar and a plurality of blades emanating from said central bar, said blades being inclined upwardly around said bar and passing around said bar in a helical pattern, thereby forming helical channels between each adjacent pair of blades.

6. The filter tube of claim 5 wherein said core is circular in cross-section and said stabilizer defines a cylindrical area, with the outer diameter of said stabilizer being substantially equal to, but slightly less than, the inner diameter of said core, whereby said stabilizer supports said core and retains its circular cross-section.

* * * * *